United States Patent [19]

Grundy

[11] 3,883,815

[45] May 13, 1975

[54] FAIL-SAFE SELECTABLE LOW-PASS FILTERING

[75] Inventor: Reed H. Grundy, Murrysville, Pa.

[73] Assignee: Westinghouse Air Brake Company, Swissvale, Pa.

[22] Filed: Aug. 15, 1973

[21] Appl. No.: 388,370

[52] U.S. Cl. ...................... 330/21; 330/29; 330/31; 330/51; 330/144

[51] Int. Cl. ............................................. H03f 3/04

[58] Field of Search .......... 330/21, 31, 29, 51, 144; 328/167

[56] References Cited

UNITED STATES PATENTS 3,124,760 3/1964 Dijkstra ............................. 330/29

*Primary Examiner*—James B. Mullins

*Attorney, Agent, or Firm*—J. B. Sotak; R. W. McIntire, Jr.

[57] ABSTRACT

This invention relates to a vital type of selectable active low-pass filtering circuit. The selectable low-pass filtering circuit includes a half section resistance-capacitance filter network and a variable gain transistor amplifier. The input of the transistor amplifier is coupled to the half section resistance-capacitance filter network and the output of the transistor amplifier is selectively coupled to one of a plurality of load resistors each of which establishes a different gain for the transistor amplifier.

8 Claims, 2 Drawing Figures

$Ei = Eo/An$ $Eo = An\,Ei$

FAIL-SAFE SELECTABLE LOW-PASS FILTERING

This invention relates to a vital electronic selectable filter and more particularly to a fail-safe active low-pass filtering circuit employing a resistance-capacitance filter network for coupling a.c. signals to the input of a transistor amplifier that has its output coupled to a selected one of a plurality of load resistors each of which varies the gain of the amplifier.

In numerous types of signal and communication systems for use in railroad and mass and/or rapid transit operations, it is common practice to employ cab signals to control the speed of a vehicle or train as it moves along its route of travel. Generally, the cab signals, that are conveyed to the vehicle or train, are in the form of coded carrier waveforms. That is, a carrier wave signal is selectively coded at one of a plurality of code rates. Each code rate signifies a given maximum speed at which a vehicle or train is permitted or authorized to travel along a particular section of trackway. In practice, the coded carrier signals are normally fed to the track rails and are picked up by inductive coils which are mounted on the front end of the vehicle or train. The induced signals are amplified, demodulated, shaped and filtered, and then the recovered signals are applied to the decoder or decoding unit which controls the state or condition of a plurality of decoding relays. One essential and necessary function in a cab signaling operation is for the carborne equipment to sense for overspeed conditions. When the actual speed of a moving vehicle or train exceeds the authorized speed permitted in a given track section or restricted area, an overspeed signal is produced onboard a violating vehicle. Normally, this speed check is accomplished by the overspeed control package. A tachometer in the form of a frequency generator produces signals which are proportional to the actual speed of the moving vehicle. Previously, the decoding relays completed a circuit path from the frequency generator through a selected one of a plurality of individual electrical filters in accordance with the last received speed command signal. It will be understood that the number of electrical filters was dependent upon the number of discrete speeds employed in the particular cab signaling system. Each filter was generally made up of four (4) sections with an isolation stage located between each section. These previous frequency filtering circuits were very costly to construct due to the excessive number of electrical components which were required to be used and assembled. The design of these previous filters presented further difficulties in that multiple adjustments were required in maintaining accuracy of the circuit components. In addition to the costliness these prior filtering circuits were relatively large and bulky requiring more storage space. Thus, the optimum type of frequency filtering circuits for cab signaling equipment should be as simple as possible in order to minimize purchase and maintenance costs and to maximize space, weight and reliability considerations.

Accordingly, it is an object of this invention to provide a unique fail-safe active filtering circuit for using in cab signaling equipment for railroad and mass and/or rapid transit operations.

A further object of this invention is to provide a vital electronic low-pass filtering circuit having an R-C network and a variable gain amplifying circuit.

Another object of my invention is to provide a novel active selectable low-pass filter comprising a half section resistance-capacitance network feeding a variable gain semiconductive amplifying circuit.

Still a further object of this invention is to provide a vital type of an electronic low-pass filtering circuit having a passive network and active amplifying circuit which includes a selected one of a plurality of load resistors for varying the gain of the amplifier.

Still another object of this invention is to provide a unique controllable gain transistor amplifying filtering circuit which operates in a fail-safe manner.

Yet a further object of this invention is to provide a new and improved selectable low-pass filter employing a half section passive R-C network and a variable gain active amplifier.

Yet another object of this invention is to provide a vital type of an active low-pass filter employing a resistance-capacitance network for supplying a.c. signals to a variable gain transistor amplifying circuit.

An additional object of this invention is to provide a fail-safe electronic low-pass filtering circuit which is economical in cost, simple in design, reliable in operation, durable in use and efficient in service.

In accordance with the present invention, the vital or fail-safe low-pass electronic filtering circuit includes a passive R-C network and an active amplifying circuit. The passive R-C network includes a simple single L or half section made up of a resistor in combination with a four-terminal capacitor. The amplifying circuit includes an NPN transistor connected in a common emitter configuration. The base electrode of the transistor amplifier is coupled to the four-terminal capacitor via a coupling capacitor. A voltage divider including a pair of series connected resistors is coupled across a source of d.c. supply or operating potential. The base electrode is directly connected to the junction of the voltage divider for forwardly biasing the NPN transistor. The emitter electrode is coupled to ground via an emitter resistor. The collector electrode is connected to the positive terminal of the d.c. supply potential via a selected one of a plurality of load resistors. The gain of the NPN transistor amplifier is varied by selecting a given one of the plurality of load resistor so that the amplified a.c. output signal which is derived from the collector electrode of the NPN transistor amplifier is a function of the resistance of the selected load resistor.

The foregoing objects and other additional features and advantages of my invention will become more fully evident from the foregoing detailed description when considered in conjunction with the accompanying drawings wherein.

Figure 1:
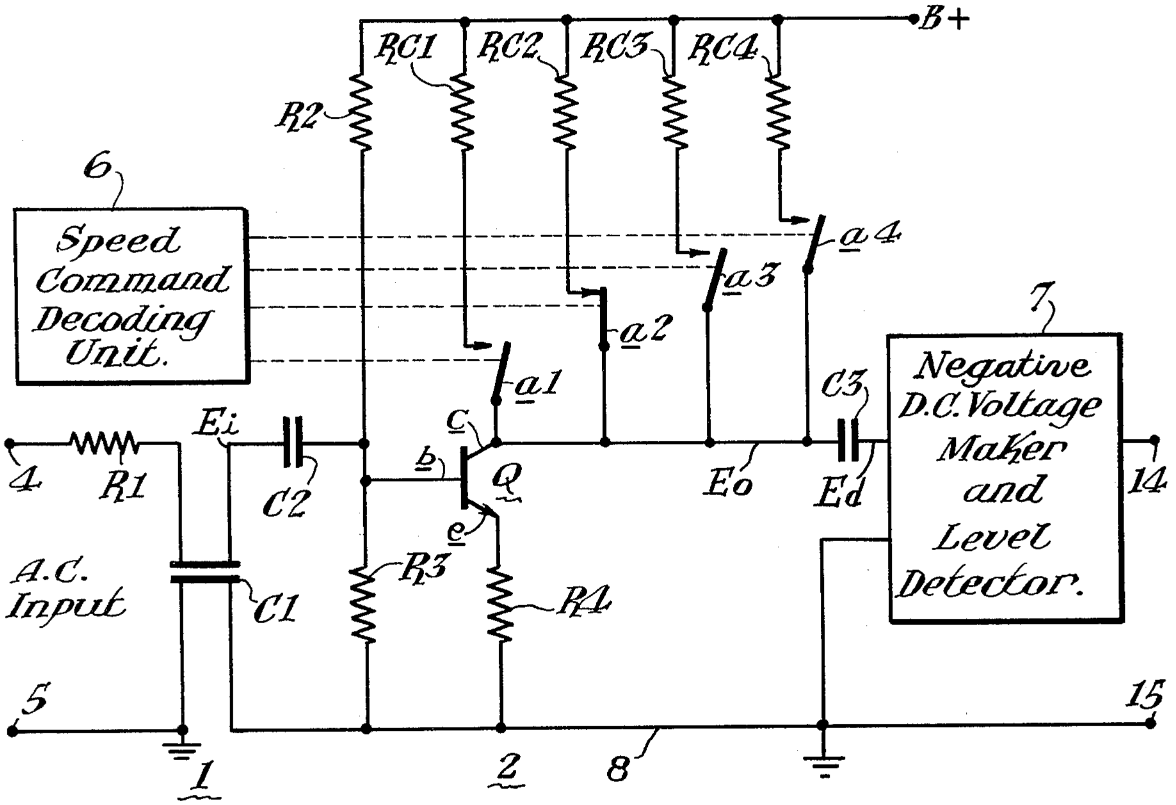
FIG. 1 is a schematic circuit diagram illustrating a preferred embodiment of the fail-safe selectable low-pass filtering circuit arrangement of the present invention.

Referring now to the drawings, and in particular to FIG. 1, there is shown a portion of the overspeed control apparatus for a cab signaling system employing the vital or fail-safe selectable electronic filtering circuit of the present invention. The filtering circuit of FIG. 1 includes a simple filter circuit in the form of a single L section or half section resistance-capacitance (R-C) filter network and a semiconductor or solid-state amplifying circuit. That is, in actual practice the vital electronic low-pass filter is basically made up of the passive resistance-capacitance (R-C) network 1 and the active transistorized amplifier circuit 2.

As shown, a resistor R1 forms the resistive arm of the low-pass R-C network 1 while a four-terminal capacitor C1 forms the reactive arm of the low-pass R-C network 1. As shown in the present instance, one end of the resistor R1 is directly connected to upper terminal 4 of a pair of a.c. input terminals while the other end of the resistor is connected to the upper plate of the four-terminal capacitor C1. The lower plate of capacitor C1 is directly connected to the other a.c. input terminal 5. Thus, a low-pass filter circuit is connected from input terminal 4 through resistor R1, through a pair of terminals of the four-terminal capacitor C1 to the input terminal 5. The a.c. input signals applied to terminals 4 and 5 are furnished by a suitable carborne source or speed sensing device, such as, an axle driven generator, so that the signal frequency is directly proportional to the actual speed of the moving vehicle and with a vitally fixed maximum amplitude. As shown, the other pair of terminals of the four-terminal capacitor C1 is coupled to the input of the semiconductive or solid-state amplifier circuit 2. The active amplifier 2 includes a single NPN transistor Q connected in a common emitter configuration. The transistor Q includes an emitter electrode *e*, a collector electrode *c*, and a base electrode *b*. The base electrode *b* is coupled to the upper plate of the four-terminal capacitor C1 via coupling capacitor C2. As shown, a voltage divider including series connected resistors R2 and R3 provides the d.c. biasing potentials for the amplifying transistor Q. That is, the upper end of the resistor R2 is coupled to the positive voltage terminal B+ of a suitable source of d.c. supply voltage (not shown). The lower end of the resistor R3 is connected to a reference potential point, such as, ground. The base electrode *b* of transistor Q is directly connected to the junction point of the voltage dividing resistors R2 and R3. The emitter electrode *e* of transistor Q is connected to the common lead 8 via resistor R4.

The collector electrode *c* of transistor Q is connected to the positive terminal B+ via a selected one of a plurality of load resistors RC1, RC2, RC3 or RC4. That is, a load circuit is completed to the B+ supply terminal by a selected respective resistor RC1, RC2, RC3 or RC4. Each of the load resistors RC1, RC2, RC3 or RC4 is under control of one of the associated front contacts *a*1, *a*2, *a*3 and *a*4, respectively. In the present instance, contact *a*1 is associated with RC1, *a*2 is associated with RC2, *a*3 is associated with RC3, and *a*4 is associated with RC4. In actual practice, the resistive value of the resistors RC1, RC2, RC3, and RC4 have been chosen to be progressively higher in value. That is, resistor RC1 is less than the value of resistor RC2, resistor RC2 is less than the value of resistor RC3, and the value of resistor RC3 is less than the value of resistor RC4. Further, it has been found advantageous and necessary to select the values of the load resistors to be a linear function of the overspeed points (speed command). As shown, the positions of movable front contacts *a*1, *a*2, *a*3 and *a*4 are controlled by a vehicle-carried speed command decoding unit 6. As previously mentioned, coded cab signals are picked up from the track rails by inductive pickup means and are demodulated, amplified, shaped, limited, and decoded by the cab signal equipment. The speed command decoding unit 6 of the cab signal equipment includes a plurality of electromagnetic decoding relays which are energized or deenergized in accordance with the code rate or frequency of the various received coded cab signals. Thus, front contacts *a*1, *a*2, *a*3 or *a*4 are either opened or closed in accordance with the electrical condition of its associated electromagnetic relay. That is, the energized and deenergized decoding relays of the decoding unit 6 function to effectively establish a load circuit path to only one of the plurality of resistors RC1, RC2, RC3, or RC4. It will be understood that a greater or lesser number of collector load resistors may be employed depending upon the number of speed commands used in any given cab signaling system. It will be appreciated that the gain of the amplifying circuit 2 is a function of the collector load resistor divider by the emitter resistor R4. In present instance, with contact *a*2 closed and contacts *a*1, *a*3 and *a*4 opened, the gain $A_2$ is equal to RC2/R4. Thus, the gain A of the amplifying circuit 2 is varied by the speed command decoding unit 6 in accordance with which one of the selected relay contacts is closed. Hence, with contact *a*1 closed the gain A1 is equal to RC1/RC4, with contact *a*3 closed the gain A3 is equal to RC3/R4 and with contact *a*4 closed the gain A is equal to RC4/R4. It will be appreciated that only one of the decoding relays of unit 6 is energized at any given time so that only one of the front contacts is closed at any given time. As shown, amplified output signals are derived from the collector electrode *c* of the amplifying transistor Q. It will be seen that the collector electrode *c* is connected to a vital type of a d.c. voltage maker and level detector 7 via coupling capacitor C3.

The fail-safe d.c. voltage maker may be of the type shown and disclosed in Letters Patent of the U.S. No. 3,527,986, namely, amplifier 9 and rectifier 21, as illustrated in FIG. 2*a*, and the level detector may be similar to the type shown and disclosed in copending application for Letters Patent of the U.S., Ser. No. 1,970, filed Jan. 12, 1970, for Fail-Safe Circuit Arrangement, by John O. G. Darrow, which is assigned to the assignee of the present application. Briefly, the d.c. voltage maker is a fail-safe amplifier-rectifier circuit in which no critical circuit or component failure is capable of increasing the gain characteristics of the circuit. Briefly, in practice, the amplifier includes two transistor amplifying stages. The amplified output from the amplifier is applied to a fail-safe voltage rectifier and voltage doubling circuit which converts the a.c. signals into d.c. voltage. The output of the amplifier-rectifier is then applied to the input of the fail-safe level detector. The fail-safe level detector includes a feedback type of oscillator circuit and a voltage breakdown device. The oscillator employs a transistor amplifier and a frequency determining circuit which is interconnected with the voltage breakdown device for controlling the amount of regeneration and, in turn, the oscillating condition of the oscillator. In operation, the voltage breakdown device normally exhibits the high dynamic impedance and only assumes a low dynamic impedance when a sufficient d.c. voltage causes the device to break down and conduct. Thus, the oscillating circuit will only produce a.c. oscillations when the d.c. voltage exceeds a predetermined amplitude, thereby causing the voltage breakdown device to exhibit a low impedance so that sufficient regenerative feedback is provided for sustaining oscillation. As shown, the vital d.c. signals will be developed across terminals 14 and 15 which, in turn, are connected to a vital type of overspeed control relay. It will be understood that the overspeed control relay includes at least one contact, namely, a front contact, which controls the circuit condition of the service brakes of the vehicle or train. It will be appreciated that the front contact is opened due to the deenergization of the overspeed control relay. Thus, during normal operation the circuit to the brake control is continuous and the service brakes are released. As will be described in detail hereinafter, the front contact is made by the energization of the overspeed control relay which results in the completion of the brake control circuit. Thus, the brakes will be applied when the overspeed relay is deenergized so that the vehicle is brought under control and decelerated to a complete stop.

Turning now to the operation of the present invention, it will be assumed that all the components and elements are intact and that the filtering circuit and the entire cab signaling system is operating properly. Further, let us assume that the present code rate being received onboard the vehicle is effective in energizing the appropriate code following relay of decoding unit 6 for picking up the front contact *a*2. As previously mentioned, it will be understood that only one of the decoding relays may be energized at any given time so that under the assumed condition front contact *a*2 is closed while the front contacts *a*1, *a*3 and *a*4 are opened. Thus, under this assumed condition the resistor RC2 is the load resistor which is connected to the collector *c* of transistor Q. Hence, the gain of the amplifier 2 is equal to RC2/R4. As mentioned above, the speed of the vehicle is constantly being sensed so that the resistor R1 and the capacitor C1 are being supplied with a.c. input signals from the axle driven frequency signal generator which is ultimately connected to input terminals 4 and 5. As noted above, the resistor R1 and the capacitor C1 form a low-pass filter circuit having the voltage-frequency characteristics shown by curve *k* of FIG. 2. It will be observed that the frequency response of the filter is initially flat or level so that substantially all of the low frequency signals produced by the tachometer or frequency generator are passed by resistor R1 and capacitor C1. Accordingly, the input signals appearing on terminals 4 and 5 are amplified by the transistor amplifier Q. The amount of amplification is dependent upon the particular gain which is set at RC2/R4 by the speed command decoding unit 6. The amplified signals are applied to the d.c. maker voltage and level detector 7 which amplifies, rectifies and detects the level of the output signals. The output signals appear on terminals 14 and 15 of the circuit 7 and are normally employed to energize a vital overspeed relay as previously mentioned. As mentioned above, the overspeed relay controls a front contact which remains closed so long as relay is picked up. Hence, the circuit to the brake control apparatus is completed so that the application of the brakes is precluded.

Figure 2:
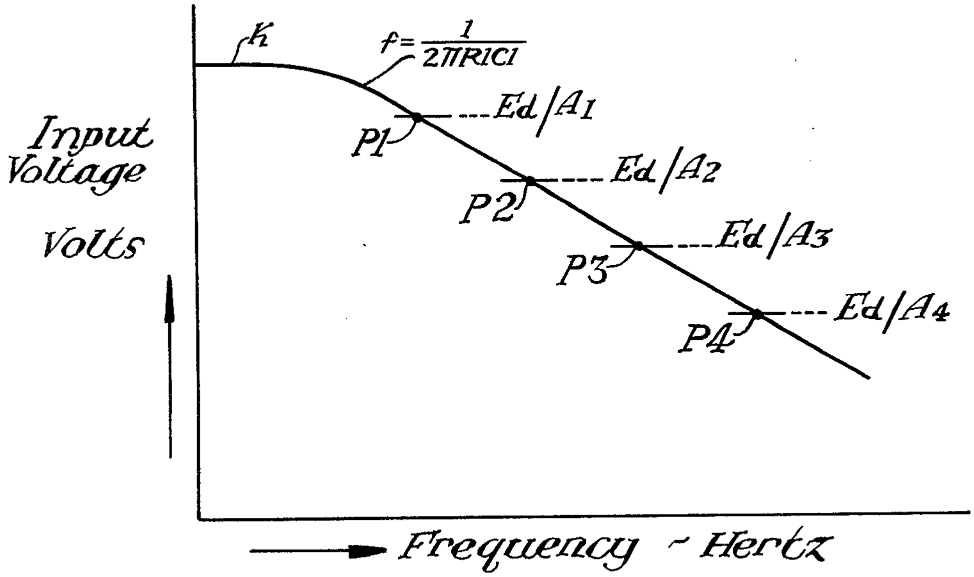
FIG. 2 is a graphic illustration of the voltage versus frequency characteristic curve of the circuit of FIG. 1.

When the signal of the tachometer or frequency reaches a given value, namely, the half power point which is $R1 = 1/\omega C1$, roll-off is produced by the attenuating characteristics of the low-pass filter network formed in the resistor R1 and capacitor C1. The decrease in the input signal is reflected on the collector electrode *c* so that output voltage Eo will also decline with increasing frequency as shown in FIG. 2. That is, the filter exhibits a transmission bandwidth from some low frequency to a specified upper frequency, namely, 1/2IIR2C1, as illustrated in the drawing. At this point, rolloff is exhibited by the filter so that an attenuating effect occurs for all higher frequencies. It will be noted that the slope of the curve is representative of the rate of attenuation which, in this case, is 6 dbs per octave, or 20 dbs per decade. It will be noted that the amplitude of the output voltage Eo continues to decrease as the frequency increases. At a given point, namely, point P2, the amplitude of the output voltage Eo intersects the voltage level Ed/A2 which is proportional to the Zener or breakdown voltage of the level detector circuit 7. Thus, at approximately point P2 the output voltage Eo will become less than the detection voltage level Ed so the Zener diode is rendered nonconductive. Hence, no signal voltage appears across terminals 14 and 15, and thus the overspeed relay becomes deenergized so that is front contact is opened. Thus, the circuit to the brake control apparatus is interrupted and the brakes of the vehicle are applied. The relay will remain deenergized and its front contact will remain opened so long as the frequency of the signal produced by the tachometer is above the frequency of the point P2. Thus, an overspeed condition is readily recognized by the presently described circuit so that the vehicle is under positive control at all times.

It will be appreciated that when the speed decoding unit 6 receives one of the other speed command signals, the front contact *a*2 will be opened and one of the other front contacts *a*1, *a*3, or *a*4 will become closed so that points P1, P3 or P4 will be the controlling levels on curve *k*. It will be seen that point P1 occurs at a lower frequency than point P2 and that points P3 and P4 occur at a higher frequency than point P2. It will be noted that the value of the output voltage Eo at point P3 is EiA3 while the output voltage level at P4 is EiA4. Similar, the output voltage Eo at any other point, such as, point *n* is appropriately EiAn. In analyzing curve *k*, it will be observed that the higher the frequency, the lower the value of output voltage. Thus, the need for greater gain.

Thus, it can be seen that a single section low-pass filter network and an active amplifying circuit employing one of a plurality of selected load resistors may be used to effectively vary the gain of the presently described fail-safe filtering circuit.

It will be understood that whenever the output voltage Eo is less than the detection voltage magnitude Ed, an overspeed condition has occurred. Therefore, in order to satisfy the negative d.c. voltage maker and level detector for higher frequencies or speeds, it is necessary to supply higher gains by the closure of higher subscript contacts of the speed command decoding unit. Conversely, the less subscript contacts of the decoding unit will be closed as a lesser gain occurs resulting in a decrease in the generated frequency amplitude which is directly proportional to the actual speed of the vehicle. This decrease in amplitude causes overspeed point to occur at lower speed because the output voltage Eo is less, and thus it is incapable of satisfying the voltage Ed of the voltage maker and level detector.

As previously mentioned, while four distinct speed commands have been described, it will be appreciated that a greater or lesser number of speed commands may be readily accommodated by the presently described invention. In addition, it will be appreciated that the resistive values of various load resistors may be other than multiples of each other depending upon the particular application and use of the presently described circuit.

Additionally, it will be noted that the circuit operates in a fail-safe fashion in that no critical component or circuit failure is capable of increasing the gain of any of the collector load resistor divided by the emitter resistor combination. It will be appreciated that it is necessary to employ certain precautionary measures in regard to the circuit design as well as the selection of components. For example, the critical resistors of the circuit are preferably constructed of a carbon composition so that they are incapable of becoming short circuited. The circuit is meticulously designed and laid out to ensure that leads in proximity of each other are incapable of touching each other to create a short circuit. The use of the four-terminal capacitor C1 ensures that the loss of a lead will not cause an unsafe condition. In addition, it will be noted that failure of the other passive elements as well as the active transistor results in elimination of the necessary biasing and operating potentials or destroys the amplifying characteristics of the transistor so that an unsafe condition, namely, a higher than normal level of voltage is not capable of being applied to the d.c. voltage maker and level detector circuit 7.

It will be appreciated that while the present invention finds particular utility in cab signaling equipment and, in particular to a speed command control arrangement, it is understood that the invention may be employed in other equipment and apparatus which have need for such operation.

In addition, it will be readily evident that this invention may be employed in other various systems and apparatus, such as, security circuits and equipment which require the vitality and safety inherently present in this invention.

Additionally, it will be understood that other changes, modifications and alterations may be employed without departing from the spirit and scope of this invention. For example, the NPN transistor may be replaced by a PNP transistor simply by changing the polarity of the d.c. supply voltage. In addition, it will be appreciated that other types of decoding units and d.c. makers and level detectors may be employed in practicing the present invention. Thus, it is understood that the showing and description of the present invention should be taken in an illustrative or diagrammatic sense only.

Having now described the invention what I claim as new and desire to secure by Letters Patent, is:

1. A vital type of a selectable low-pass filtering circuit comprising, a half section filter network including a resistive element and a four-terminal capacitive element, said four-terminal capacitive element having a first and a second pair of terminals, said first pair of terminals coupled to a source of a.c. input signals, and a variable gain amplifier having its input connected to said second pair of terminals and having its output coupled to at least a select one of a plurality of load resistors so that the gain of the amplifier is varied in accordance with the value of the selected load resistor.

2. A vital type of a selectable low-pass filtering circuit as defined in claim 1, wherein said variable gain amplifier includes an active semiconductive device.

3. A vital type of a selectable low-pass filtering circuit as defined in claim 1, wherein said variable gain amplifier includes a transistor connected in a common emitter configuration.

4. A vital type of a selectable low-pass filtering circuit as defined in claim 1, wherein said variable gain amplifier includes a transistor having its collector electrode coupled to the selected one of said plurality of said load resistors.

5. A vital type of a selectable low-pass filtering circuit as defined in claim 1, wherein a switching device couples each of the selected ones of said plurality of said load resistors to the output of said variable gain amplifier.

6. A vital type of a selectable low-pass filtering circuit as defined in claim 1, wherein a relay contact couples a selected one of said plurality of said load resistors to the output of said variable gain amplifier.

7. A vital type of a selectable low-pass filtering circuit as defined in claim 1, wherein said variable gain amplifier includes a transistor having an emitter, a collector and a base electrode, said base electrode coupled to the junction of a voltage dividing network which is connected between a voltage supply terminal and ground, said emitter electrode resistively coupled to ground, said collector electrode coupled to said voltage supply terminal by the selected one of said plurality of said load resistors.

8. A vital type of a selectable low-pass filtering circuit as defined in claim 1, wherein said half section filter network is coupled to said input of said variable amplifier by a coupling capacitor.

* * * * *